United States Patent
Yu et al.

(10) Patent No.: US 10,007,867 B2
(45) Date of Patent: Jun. 26, 2018

(54) SYSTEMS AND METHODS FOR IDENTIFYING ENTITIES DIRECTLY FROM IMAGERY

(71) Applicant: Google Inc., Mountain View, CA (US)

(72) Inventors: Qian Yu, Belmont, CA (US); Liron Yatziv, Sunnyvale, CA (US); Yeqing Li, Mountain View, CA (US); Christian Szegedy, Sunnyvale, CA (US); Sacha Christopher Arnoud, San Francisco, CA (US); Martin C. Stumpe, Belmont, CA (US)

(73) Assignee: Google LLC, Mountain View, CA (US)

( * ) Notice: Subject to any disclaimer, the term of this patent is extended or adjusted under 35 U.S.C. 154(b) by 129 days.

(21) Appl. No.: 15/089,677

(22) Filed: Apr. 4, 2016

(65) Prior Publication Data

US 2017/0286805 A1    Oct. 5, 2017

(51) Int. Cl.
G06K 9/62 (2006.01)
G06F 17/30 (2006.01)
G06K 9/32 (2006.01)

(52) U.S. Cl.
CPC ....... *G06K 9/6259* (2013.01); *G06F 17/3028* (2013.01); *G06F 17/30247* (2013.01); *G06F 17/30702* (2013.01); *G06K 9/3258* (2013.01); *G06K 9/6215* (2013.01)

(58) Field of Classification Search
None
See application file for complete search history.

(56) References Cited

U.S. PATENT DOCUMENTS

| | | | |
|---|---|---|---|
| 7,171,046 B2 * | 1/2007 | Myers | G06K 9/3258 382/187 |
| 8,442,716 B2 * | 5/2013 | Epshtein | G06F 17/30241 30/32 |
| 8,868,522 B1 * | 10/2014 | Zennaro | G06F 17/30241 707/694 |
| 8,965,112 B1 * | 2/2015 | Ibarz | G06K 9/6256 382/105 |
| 9,373,057 B1 * | 6/2016 | Erhan | G06K 9/6202 |
| 9,547,821 B1 * | 1/2017 | Loreggia | G06N 3/08 |

(Continued)

OTHER PUBLICATIONS

Long-Term Recurrent Convolutional—Description, Jeff Donahue et al., CVPR, 2015, pp. 2625-2634.*

(Continued)

*Primary Examiner* — Jayesh A Patel
(74) *Attorney, Agent, or Firm* — Dority & Manning, P.A.

(57) ABSTRACT

Systems and methods of identifying entities are disclosed. In particular, one or more images that depict an entity can be identified from a plurality of images. One or more candidate entity profiles can be determined from an entity directory based at least in part on the one or more images that depict the entity. The one or more images that depict the entity and the one or more candidate entity profiles can be provided as input to a machine learning model. One or more outputs of the machine learning model can be generated. Each output can include a match score associated with an image that depicts the entity and at least one candidate entity profile. The entity directory can be updated based at least in part on the one or more generated outputs of the machine learning model.

19 Claims, 6 Drawing Sheets

(56) References Cited

U.S. PATENT DOCUMENTS

| | | | | |
|---|---|---|---|---|
| 9,807,473 B2* | 10/2017 | Mei | ................... | H04N 21/8405 |
| 2008/0273795 A1* | 11/2008 | Ofek | ................... | G06K 9/4642 |
| | | | | 382/170 |
| 2009/0074300 A1* | 3/2009 | Hull | ................. | G06F 17/30247 |
| | | | | 382/209 |
| 2009/0154795 A1* | 6/2009 | Tan | ................... | G06F 17/30247 |
| | | | | 382/155 |
| 2009/0279794 A1* | 11/2009 | Brucher | ............ | G06F 17/30241 |
| | | | | 382/225 |
| 2010/0250109 A1* | 9/2010 | Johnston | ............ | G06Q 30/0261 |
| | | | | 701/532 |
| 2010/0250126 A1* | 9/2010 | Epshtein | ............ | G01C 21/3602 |
| | | | | 701/438 |
| 2014/0012880 A1* | 1/2014 | Bluvband | ......... | G06F 17/30268 |
| | | | | 707/780 |
| 2016/0099010 A1* | 4/2016 | Sainath | ................... | G10L 25/30 |
| | | | | 704/232 |
| 2017/0118576 A1* | 4/2017 | Sharifi | ................ | G06F 17/3053 |
| 2017/0150235 A1* | 5/2017 | Mei | ................... | H04N 21/8405 |
| 2017/0255832 A1* | 9/2017 | Jones | ................ | G06K 9/00771 |
| 2017/0364766 A1* | 12/2017 | Das | ..................... | G06K 9/4628 |

OTHER PUBLICATIONS

International Search Report for PCT/US2016/065616 dated Mar. 9, 2017, 11 pages.

\* cited by examiner

US 10,007,867 B2

SYSTEMS AND METHODS FOR IDENTIFYING ENTITIES DIRECTLY FROM IMAGERY

FIELD

The present disclosure relates generally to updating entity listings, and more particularly to updating entity listings using one or more images that depict an entity.

BACKGROUND

Geographic information systems generally include information associated with a plurality of entities (e.g. businesses, restaurants, points of interest, landmarks, etc.). For instance, such associated information can include a name, phone number, location, category URL, email address, street address, hours of operation, and/or other information associated with the entity. Such information may be stored in an entity directory having one or more entity profiles associated with one or more entities. Conventional techniques of populating an entity directory can include manually inputting information into the entity profiles.

Other techniques can include matching one or more images depicting the entity to a corresponding entity profile, and populating the entity profile based at least in part on information associated with the image. For instance, optical character recognition (OCR) or other techniques can be performed on an image that depicts a storefront of an entity to determine information associated with the entity. The entity can then be matched with an entity profile based at least in part on the determined information.

Such OCR techniques can be unreliable. For instance, the OCR the images may contain one or more features or defects that lead to an inaccurate transcription of text depicted in the image. For instance, an image may include an occluded view of the storefront, blurring issues, stitching issues, etc. As another example, the storefront may include signage that is difficult to transcribe using OCR. For instance, the signage may be crowded or busy, or the signage may include "fancy" fonts that are difficult to transcribe.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of identifying an entity. The method includes identifying, by one or more computing devices, from a plurality of images, one or more images that depict an entity. The method further includes determining, by the one or more computing devices, one or more candidate entity profiles from an entity directory based at least in part on the one or more images that depict the entity. The method further includes providing, by the one or more computing devices, the one or more images that depict the entity and the one or more candidate entity profiles as input to a machine learning model. The method further includes generating, by the one or more computing devices, one or more outputs of the machine learning model. Each output comprises a match score associated with an image that depicts the entity and at least one candidate entity profile. The method further includes updating, by the one or more computing devices, the entity directory based at least in part on the one or more generated outputs of the machine learning model.

Other example aspects of the present disclosure are directed to systems, apparatus, tangible, non-transitory computer-readable media, user interfaces, memory devices, and electronic devices for identifying entities.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
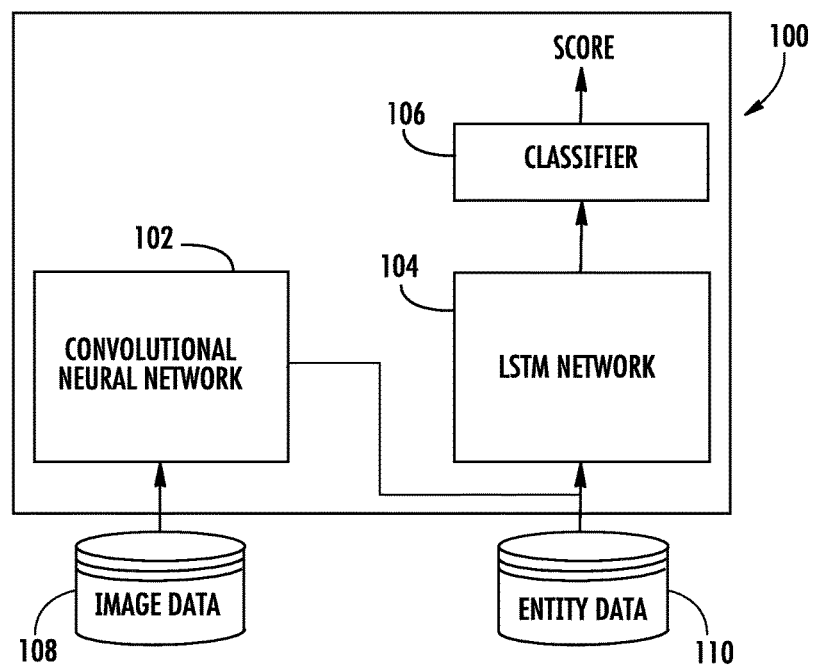
FIG. 1 depicts an example machine learning network according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to matching images of entities with a corresponding entity profile. In particular, one or more images that depict an entity (e.g. a business) can be identified from a plurality of images. One or more candidate entity profiles can then be determined based at least in part on the one or more images depicting the entity. The one or more images and the one or more candidate entity profiles can be provided as input to a machine learning model to determine a match between the entity depicted in the one or more images and a candidate entity profile. For instance, the model can output one or more match scores indicative of a degree of confidence that the entity depicted in the one or more images matches the candidate entity profile(s). In this manner, a match can be found between an entity depicted in an image and an entity profile if the corresponding match score is greater than a match threshold.

More particularly, the plurality of images can be street level images that depict various streetscapes. In some implementations, the plurality of images may include or otherwise be associated with panoramic street level images. One or more images from the plurality of images may depict an entity, such as a business, establishment, landmark, point of interest (POI), or other object or event associated with a geographic location. For instance, an image may depict a storefront of the entity. Such images that depict entities may be identified, for instance, by detecting the depicted entity within the image. In some implementations, one or more bounding boxes may be created around an entity depicted in an image, such that a portion of the image depicting the entity is identified.

In some implementations, an entity directory may be used to store information associated with a plurality of entities. For instance, the entity directory may include an entity profile for each entity. The entity profiles may include structured information specifying one or more characteristics associated with the entities. The characteristics may include, for instance, the entity name, phone number, URL, location information (e.g. latitude, longitude coordinates), category, and/or various other suitable characteristics associated with the entity. In some implementations, the entity directory may be stored in one or more databases located at one or more remote computing devices (e.g. servers).

As indicated, once one or more images depicting an entity are identified, one or more candidate entity profiles can be determined for the entity based at least in part on the one or more images. For instance, in some implementations, the one or more images that depict the entity may have associated location data (e.g. geolocation), indicative of a location of the entity and/or an image capture device that captured the image depicting the entity. The one or more candidate entity profiles can include entity profiles from the entity directory having associated location data within a threshold distance of the geolocation associated with the one or more images. For instance, the candidate entity profiles may include each entity profile specifying location data for an entity corresponding to within about 250 meters of the geolocation associated with the one or more images. As used herein, the term "about," when used in conjunction with a numerical value is intended to refer to within 40% of the numerical value. It will be appreciated that various other suitable distance thresholds can be used without deviating from the scope of the present disclosure.

The one or more images that depict the entity and the candidate entity profiles can be provided as input to a machine learning model. For instance, the machine learning model can be a neural network model, such as a deep neural network model and/or a convolutional neural network model. In some implementations, the machine learning model can include various other suitable models, such as a recurrent neural network (e.g. a long short-term memory (LSTM) network, and/or a convolutional LSTM network), or other suitable model. The machine learning model can generate one or more outputs based at least in part on the images depicting the entity and the entity profile(s). In particular, an output of the model can include a match score for the entity depicted in the one or more images and a candidate entity profile. The match score can be indicative of a degree of confidence that the candidate entity profile corresponds to the entity depicted in the one or more images. In some implementations, the match score can be determined without determining other information associated with the images prior to inputting the images and/or the entity profile into the machine learning model.

As indicated, in some implementations, the machine learning model can include a deep convolutional neural network (CNN). For instance, the CNN can be configured to extract one or more features from the image(s) that depict the entity. The CNN can include a plurality of interconnected operators or nodes located in one or more layers. Each node can be configured to receive one or more inputs, perform one or more computations based at least in part on the inputs, and to generate an output. In some instances, a node can be configured to provide the output of the node to one or more additional nodes, such that the additional nodes receive such output as an input.

In some implementations, the machine learning model may further include an LSTM or other recurrent neural network, such as a convolutional LSTM. In such implementations, the CNN can be configured to receive data indicative of the one or more images as input and the LSTM can be configured to receive data indicative of the candidate entity profile(s). In particular, the CNN can be configured to extract features from the images, while the LSTM can be configured to obtain text-related information from the candidate entity profile(s). The CNN may be further configured to provide data indicative of the extracted features to the LSTM. The LSTM may model at least a portion of the structured information from a candidate entity profile as a sequence of characters, such that a match score between the extracted features of the one or more images and the data from the candidate entity profile can be determined.

In some implementations, the output(s) of the machine learning model (e.g. the match scores) can be determined without explicitly transcribing text depicted in the images depicting the entity and/or determining other suitable information associated with the images prior to inputting the images and the entity profiles into the machine learning model. For instance, the CNN can be configured to extract features from the image(s) without transcribing text, for instance, located on storefront signage depicted in the image (s). In this manner, the match score can be determined between the extracted features of the image, and the data from the entity profile, and not from a transcription of text depicted in the image(s).

The machine learning model may be trained using a plurality of training images and verified information associated with the images (e.g. training data), resulting in a trained model. For instance, the model may be trained using principal component analysis techniques, stochastic gradient descent techniques, and/or various other suitable training techniques. For instance, training the model may include providing the training data to the model as input, and comparing the output generated by the model to a target output. The comparison may be used to adjust or otherwise tune the model to minimize or reduce the difference between the generated output and the target output. For instance, in some implementations, the model may be automatically adjusted (e.g. by a computing system associated with the model). Alternatively, the model may be adjusted manually by an operator or user. In some implementations, the model may be gradually adjusted in an iterative manner.

In some implementations, the machine learning model can include multiple LSTM networks along with a single CNN. For instance, in some implementations, the machine learning model may include ten LSTM networks along with a single CNN. It will be appreciated that other numbers of LSTM networks may be used. The multiple LSTM networks can be configured to simultaneously determine a match score between an entity depicted in an image and multiple entity profiles. In this manner, data indicative of a different entity profile can be provided to each LSTM network. The CNN can extract features from one or more images depicting an entity and provide data indicative of the extracted features to each LSTM network. Each LSTM network may then be configured to determine a match score between the respective entity profiles and the entity depicted in the image(s) in a parallel manner. Such network architecture can accelerate training and/or operating the machine learning model by allowing multiple match scores to be determined simultaneously.

The match scores can be compared to a match threshold to determine whether an entity profile matches an entity depicted in an image. For instance, if the match score is greater than the match threshold, a match can be found between the entity profile and the entity depicted in the image. Conversely, if the match score is less than the match threshold, a match will not be found. If a match is found, the entity directory can be verified and/or updated based at least in part on the images that depict the entity. For instance, the entity profile matching the entity depicted in the images can be compared against the location information or other information associated with the images. If the location information from the images is the same as the location information from the entity profile, the entity profile can be verified. As another example, if the location information from the images is different than the location information from the entity profile, the entity profile can be updated to replace the current location information with the location associated with the images. As yet another example, when a match is found, one or more images depicting the entity can be associated with the entity profile.

In some implementations, if a match is not found between any of the candidate entity profiles and the entity depicted in the image(s), a new entity profile can be created for the entity. In particular, an entity not matching any candidate entity profile can indicate that the entity does not have an associated entity profile in the entity directory. In this manner, the one or more images that depict the entity and/or information associated with the one or more images (e.g. location information) can be used to create the entity profile.

In some implementations, the entity directory can be associated with a geographic information system, or other system. For instance, the entity directory can be used to provide information associated with an entity or other geographic location to a user device responsive to a request for such information. In particular, the user can request information associated with an entity through one or more interactions with the user device. The user device can provide a request for information associated with the entity to a remote computing device (e.g. server) that hosts or is otherwise associated with the entity directory. The server can access an entity profile corresponding to the entity from the entity directory, retrieve at least a portion of the requested information, and provide the at least a portion of requested information to the user device.

With reference now to the figures, example aspects of the present disclosure will be discussed in greater detail. For instance, FIG. 1 depicts an example machine learning model 100 according to example embodiments of the present disclosure. In particular, model 100 includes a convolutional neural network (CNN) 102, a long short-term memory (LSTM) network 104 and a classifier 106. In some implementations, classifier 106 can correspond to a logistic regression network or other classifier. CNN 102 can include an input layer, an output layer, and one or more hidden layers. Each layer can include one or more nodes or operators. Each node can be connected to one or more nodes in at least one other layer. In some implementations, CNN 102 can include one or more stacked convolutional layers.

Figure 2:
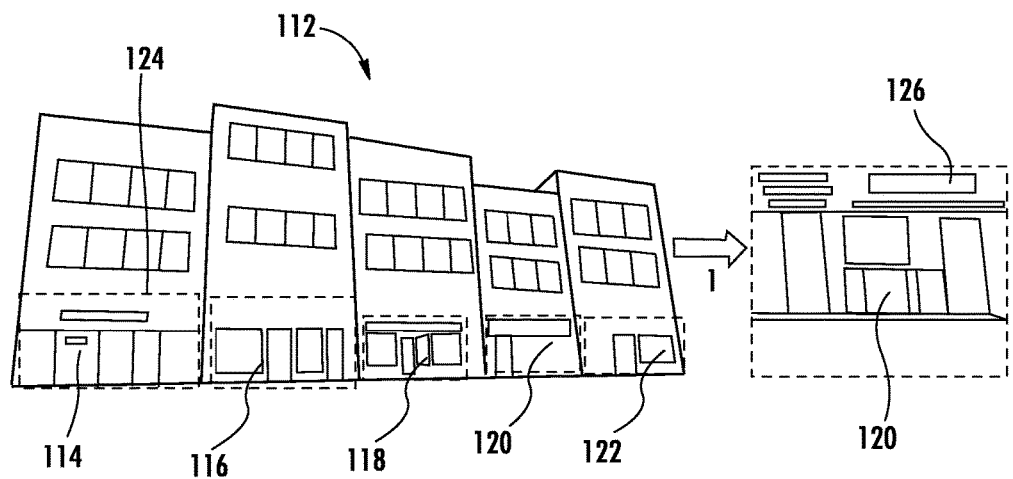
FIG. 2 depicts example imagery and detected entities depicted by the imagery according to example embodiments of the present disclosure.

As indicated above, CNN 102 can be configured to receive image data 108. In particular, image data 108 can include data indicative of one or more images that depict an entity. In some implementations, the one or more images may be associated with panoramic street level imagery depicting a streetscape. One or more images or image portions that depict entities may be identified. For instance, FIG. 2 depicts example imagery 112 with detected entities according to example embodiments of the present disclosure. As shown, image 112 is a street level image depicting entities 114, 116, 118, 120, and 122 along a streetscape. In particular, image 112 depicts the storefronts of entities 114-122. In some implementations, when an entity is detected in image 112, a bounding box can be positioned around the entity. For instance, a bounding box 124 surrounds each entity 114-122 in image 112. A bounding box 124 can specify a boundary of an image portion to be provided to CNN 102 of FIG. 1. For instance, image 126 depicts a portion of image 112 that depicts entity 120.

Referring back to FIG. 1, image data 108 can include encoded data indicative of, for instance, image 112 or other image. For instance, image data 108 may include a sequence of pixel values associated with image 112. As indicated above, CNN 102 can be configured to extract a plurality of features from image data 108 and to provide data indicative of the extracted features to LSTM network 104. LSTM network 104 can include one or more LSTM nodes instead of or in addition to one or more other nodes. An LSTM node can be configured to "remember" a value for an arbitrary length of time.

LSTM 104 can receive entity data 110 as input. Entity data 110 can be data indicative of at least a portion of an entity profile for an entity. Entity data 110 may be obtained from a database storing an entity directory. The entity directory may contain a plurality of entity profiles, each containing information associated with a different entity. For instance, an entity profile may include information such as a name, phone number, URL, location, category, and/or other suitable information associated with an entity. In some implementations, entity data 110 can include structured data associated with one or more candidate entity profiles. For instance, the one or more candidate entity profiles may include entity profiles associated with entities located within a distance threshold of the entity associated with image data 108. In some implementations, the candidate entity profiles may be identified and/or obtained by filtering the entity directory based at least in part on the distance threshold.

As indicated, in some implementations, entity data 110 may include a portion of data from the candidate entity profile(s). For instance, entity data 110 may include only data indicative of the name of an entity. As another example, entity data 110 may include data indicative of a name, category, and phone number of an entity. It will be appreciated that various suitable combinations of entity profile data may be used without deviating from the scope of the present disclosure.

LSTM 104 can be configured to obtain or capture text-related data associated with entity data 110. In particular, LSTM 104 may be configured to model at least a portion of the structured information associated with entity data 110 as a sequence of characters. In some implementations, LSTM 104 can further be configured to provide the extracted features associated with image data 108 and the text-related data associated with entity data 110 to classifier 106. Classifier 106 can be configured to determine a match score between the entity associated with image data 108, and the entity profile associated with entity data 110. The match score can be a confidence value specifying the likelihood that the entity associated with image data 108 is the same entity as the entity associated with entity data 110.

It will be appreciated that machine learning model 100 can include various other suitable implementations without deviating from the scope of the present disclosure. For instance, in some implementations, LSTM 104 may be a convolutional LSTM network. As another example machine learning model 100 may further include an embedding layer before LSTM 104 configured to map at least a portion of entity data 110 into a continuous vector space. As yet another example, machine learning model 100 may include multiple LSTM networks configured to determine multiple match scores in parallel.

Figure 3:
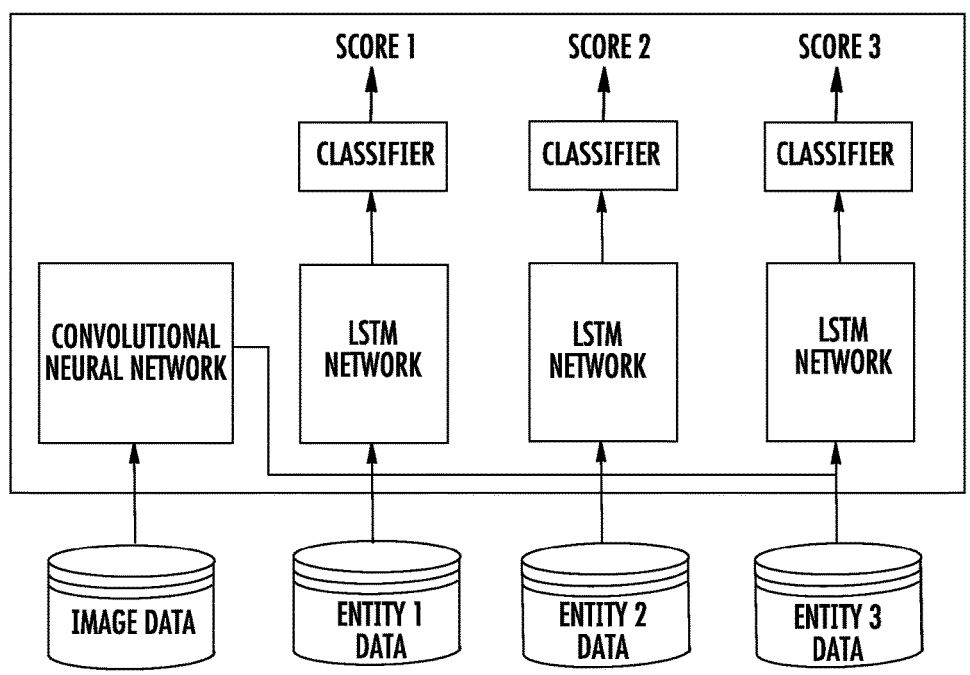
FIG. 3 depicts an example machine learning network according to example embodiments of the present disclosure.

For instance, FIG. 3 depicts a machine learning model 200 according to example embodiments of the present disclosure. Machine learning model 200 includes a CNN 202 and LSTM networks 204, 206, and 208. In some implementations, CNN 202 can correspond to CNN 102 of FIG. 1, and each LSTM network 204-208 can correspond to LSTM network 104 of FIG. 1. CNN 202 can receive image data 210 as input, and LSTM networks 204-208 can receive entity data 212, 214, and 216 as input. In particular, LSTM 204 can receive entity 1 data 212, LSTM 206 can receive entity 2 data 214, and LSTM 208 can receive entity 3 data 216. In some implementations, entity data 212 include entity data associated with a first entity profile, entity data 214 can include entity data associated with a second entity profile, and entity data 216 can include entity data associated with a third entity profile. It will be appreciated that various other suitable numbers of LSTM networks may be included in machine learning model 200 without deviating from the scope of the present disclosure.

As indicated above with regard to CNN 102, CNN 202 can be configured to extract features from image data 210. CNN 202 can further be configured to provide data indicative of the extracted features to LSTMs 204-208. In this manner, each LSTM 204-208 can receive the same feature parameters from CNN 202. LSTMs 204-208 can then be configured to obtain text-related data associated with the respective entity data 212-216, and to provide the data indicative of the extracted features and the text-related data to the respective classifiers 218, 220, and 222 to determine match scores between the entity associated with image data 210 and the respective entity profiles associated with entity data 212-216 in a parallel manner. As indicated, such architecture having multiple LSTM networks can provide speed increases in training and/or operating machine learning model 200.

Figure 4:
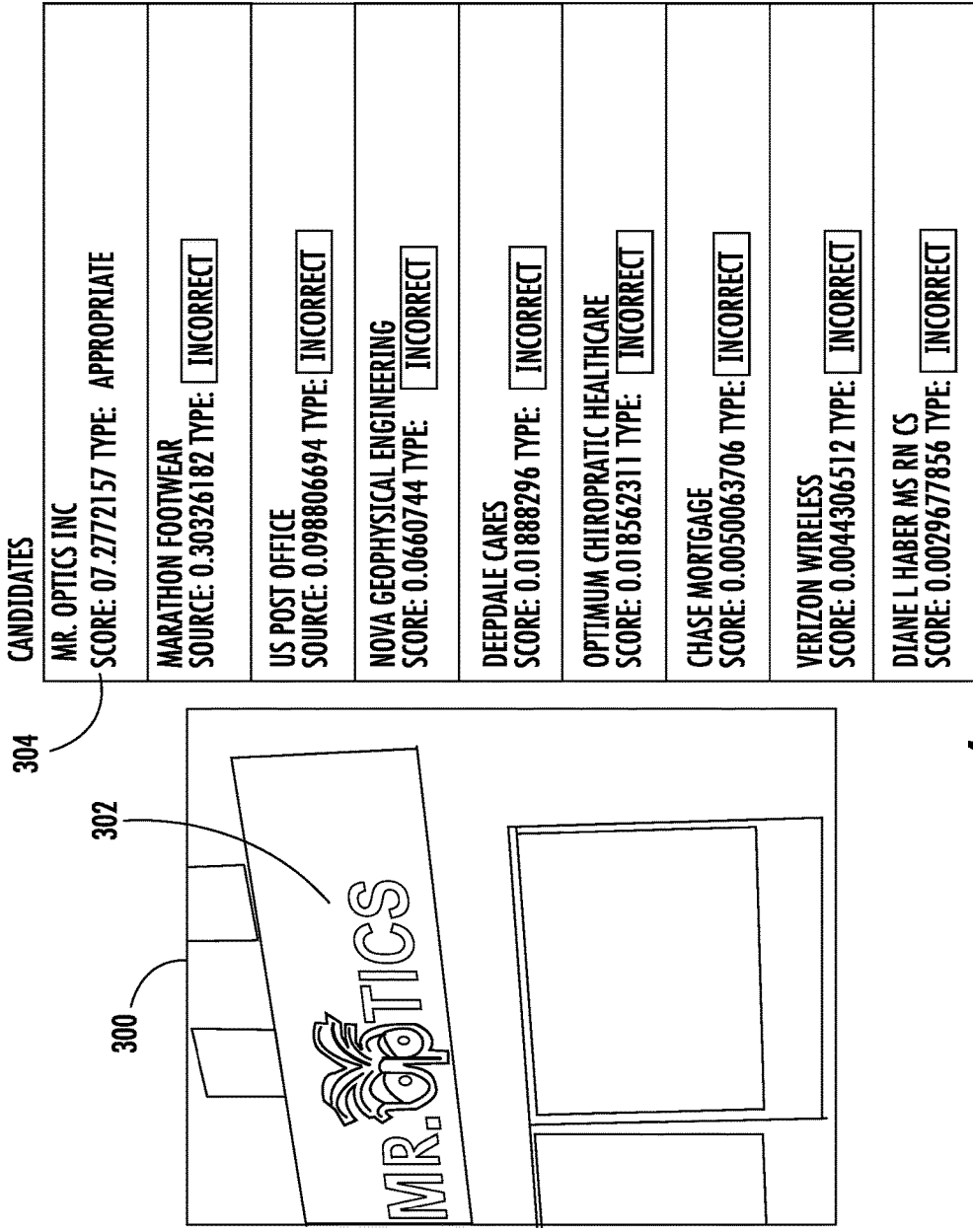
FIG. 4 depicts an example image depicting an entity and example match scores associated with the entity according to example embodiment of the present disclosure.

FIG. 4 depicts an example image 300 depicting an entity 302 and example match scores for a plurality of candidate entity profiles 304 according to example embodiments of the present disclosure. As shown image 300 was captured from street level, and depicts the storefront of entity 302 (e.g. Mr. Optics). As described above, image 300 can be encoded, for instance, as a representation of pixel values, and provided as input to a machine learning model (e.g. machine learning model 100). The machine learning model can be configured to determine match scores between entity 302 and the each candidate entity profile 304. Candidate entity profiles 304 can include one or more entity profiles associated with entities located within a threshold distance of location data associated with image 300. As shown, the match score can be a value between zero and one, with one representing a positive match. It will be appreciated that the match score can be represented in various other suitable manners, such as a percentage, or using a different scale. In some implementations, each match score can be compared to a match threshold to determine whether the candidate entity profile corresponds to entity 302. As shown in FIG. 4, a determination of "appropriate" or "inappropriate" can be made for each candidate entity profile based at least in part on the corresponding match scores.

FIG. 4 depicts a match score of 0.727 between entity 302 and the candidate entity profile associated with Mr. Optical Inc. As shown, such match score can be indicative of a "match" between entity 302 and the candidate entity profile associated with Mr. Optical Inc. In some implementations, the match scores may be determined based at least in part on a transcription of text depicted in image 300. For instance, one or more optical character recognition techniques can be used to transcribe such text. In alternative implementations, the match scores can be determined without transcribing text depicted in image 300.

In some instances, an entity may include storefront signage written in "fancy" or stylized font. For instance, entity 302 includes a sign wherein the 'o' and the 'p' in the word "optical" are stylized as a pair of reading glasses located on a person's face. The machine learning model can be configured to extract features associated with such stylization and to determine match scores for entities having such signage. As another example, an image depicting an entity may depict an occluded view of the entity, or an image associated with a panoramic image may include one or more misalignments caused by a stitching error in the panoramic image. Such image inconsistencies and/or view problems may be taken into account by the machine learning model when extracting features, such that an accurate match score can be determined.

Figure 5:
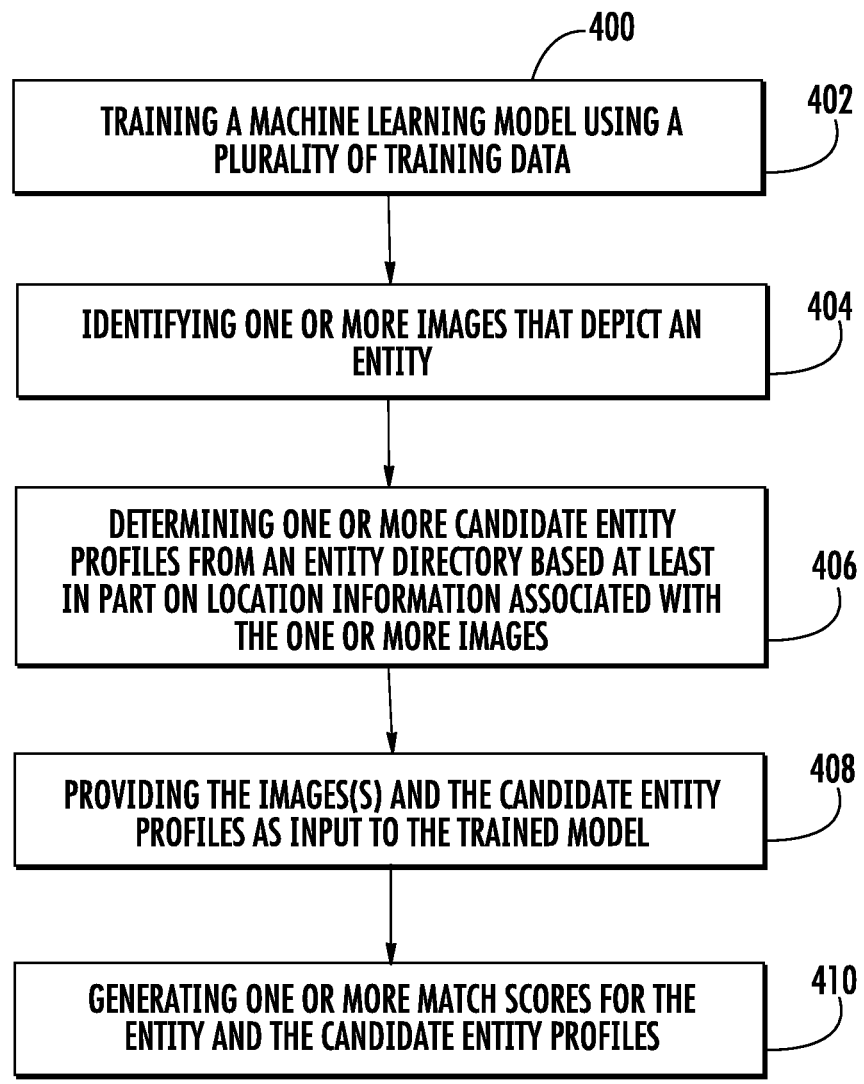
FIG. 5 depicts a flow diagram of an example method of determining a match score between an entity and an entity profile according to example embodiments of the present disclosure.

FIG. 5 depicts a flow diagram of an example method (400) of generating match scores between an entity and one or more entity profiles according to example embodiments of the present disclosure. Method (400) can be implemented by one or more computing devices, such as one or more of the computing devices depicted in FIG. 7. In addition, FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402), method (400) can include training a machine learning model using a plurality of training data. In particular, the training data can include a set of training images and corresponding entity data associated with images. The training images and the entity data can be provided as input to the machine learning model. As indicated above, the machine learning model can generate an output based on the training images and the entity data, which can be compared to a target output. The model can then be adjusted or tuned in an incremental and/or iterative manner based at least in part on the comparison. In some implementations, the model can be trained using a stochastic gradient descent technique, or other training technique. The model can be trained to a sufficient degree, resulting in a trained model.

At (404), method (400) can include identifying one or more images that depict an entity. For instance, the one or more images can be street level images that depict various streetscapes. In some implementations, the images can be panoramic images. Identifying an image that depicts an entity can include detecting the entity within image. For instance, the entity can be detected in the image using one or more entity detection techniques. In some implementations, such entity detection techniques can include one or more neural network based detection techniques or other suitable detection technique. For instance, a convolutional neural network based detection technique can be applied to one or more crops or regions within a panoramic image to determine bounding boxes associated with one or more entities.

In some implementations, one or more image portions depicting the entity can be identified. For instance, once an entity is detected in an image, a bounding box can be positioned around the detected entity. The bounding box can specify a boundary for a portion of the image to be provided as input to the machine learning model. In this manner, the images and/or image portions provided as input to the machine learning model may be of a standard size and/or format.

At (406), method (400) can include determining one or more candidate entity profiles from an entity directory. For instance, in some implementations, the candidate entity profiles can be determined based at least in part on location information associated with the one or more images. In particular, each image (e.g. street level image) can include associated geolocation data. In some implementations, the geolocation data can be associated with an image and/or an image capture device used to capture the image. For instance, the geolocation data can be associated with a pose (e.g. position and/or orientation) of the image capture device when the corresponding image is captured.

The location information for the one or more images that depict the entity can be compared against location data associated with a plurality of entity profiles in the entity directory to determine the candidate entity profile(s). In some implementations, an entity profile can be selected as a candidate entity profile if the entity associated with the entity profile is located within a threshold distance of the location associated with the image(s). For instance, the threshold distance can be implemented as a radius (e.g. about 100 meters, about 250 meters, or other radius) around the location of the image(s) and the one or more candidate entity profiles can include each entity profile having associated location data that is within the radius. In this manner, the candidate entity profiles can be a subset of the plurality of entity profiles associated with the entity directory.

At (408), method (400) can include providing data indicative of the image(s) and data indicative of the candidate entity profile(s) as input to the trained model. For instance, as indicated above, the model may include a CNN and/or one or more LSTM networks. In some implementations, the data indicative of the images can be provided as input to the CNN, and the data indicative of the entity profiles can be provided to the one or more LSTM networks. The trained model can perform one or more calculations to determine a match score between the image data and the entity data.

In implementations wherein the trained model includes multiple LSTM networks, each LSTM network can receive as input data indicative of a different entity profile. For instance, a first LSTM network can receive as input data indicative of a first entity profile, a second LSTM network can receive as input data indicative of a second entity profile, etc. In this manner, the trained model can determine multiple match scores between the image(s) and multiple entity profiles in a parallel manner. For instance, the CNN can be configured to extract or determine one or more features associated with the image(s), and to provide data indicative the one or more features to each LSTM network. Each LSTM network can be configured to model the data indicative of the corresponding entity profile as a sequence of characters to determine a match score between the image(s) and the entity profile. In some implementations, a classifier can be used to determine the match score.

At (410), method (400) can include generating or determining one or more match scores between the entity depicted in the image(s) and the candidate entity profile(s). As indicated the match scores may be determined in a sequential manner, or one or more match scores may be determined in parallel. The match score(s) may provide an indication of whether the entity corresponds to the candidate entity profile(s). For instance, the match score(s) can provide a degree of confidence that the image(s) depict the same entity as described in the entity profile. In some implementations, the match score can be a score between a range of zero and one. It will be appreciated that other suitable match scores can be used. Once the match score(s) are determined, the entity directory can be updated based at least in part on the match score(s).

Figure 6:
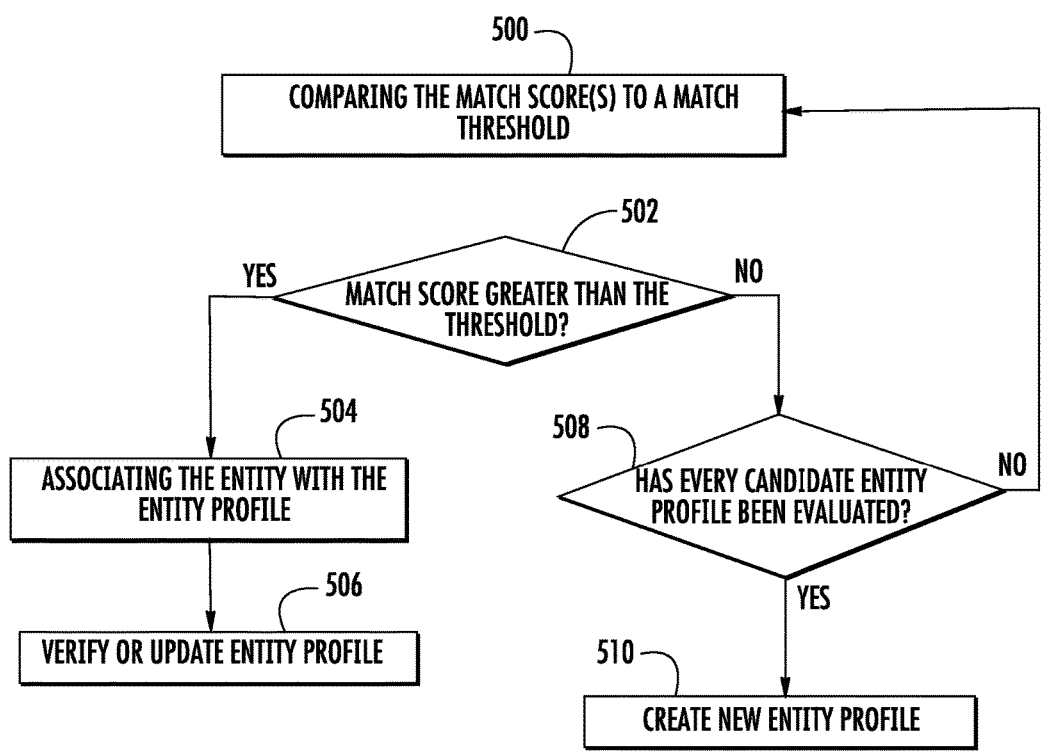
FIG. 6 depicts a flow diagram of an example method of determining a match between an entity and an entity profile according to example embodiments of the present disclosure.

For instance, FIG. 6 depicts a flow diagram of an example method (500) of updating an entity directory according to example embodiments of the present disclosure. Method (500) can be implemented by one or more computing devices, such as one or more of the computing devices depicted in FIG. 7. In addition, FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (502), method (500) can include comparing the match score(s) to a match threshold. The match threshold can be a value (or range of values) within the match score range. The match score(s) can be compared against the match threshold to determine whether the match score(s) indicate a match between the entity depicted in the image(s) and the entity profile. For instance, if a match score is greater than the match threshold, a match can be determined. In this manner, if a match score is greater than the match threshold, method (500) can include associating the entity with the entity profile (504).

At (506), method (500) can include updating the entity profile based at least in part on information associated with the entity depicted in the image(s). In some implementations, updating the entity profile can include updating the location of the entity profile with the location (e.g. triangulated location) associated the image(s), as the location information associated with the image(s) is often more accurate than the location information (e.g. latitude, longitude coordinates) associated with the entity profile. For instance, in some implementations, the location information associated with the entity profile can be compared to the location information associated with the image(s). If the locations match, the entity profile can be verified. If the locations don't match, the entity profile can be modified to include the location associated with the image(s). It will be appreciated that the images(s) that depict the entity may have other associated information relating to the entity, and that the entity profile can be updated (e.g. modified and/or verified) based on such other information.

Referring back to (502), if the match score is not greater than the match threshold, method (500) can include determining whether every candidate entity profile has been evaluated (508). If every candidate entity profile has been evaluated, method (500) can include creating a new entity profile (510). For instance, an entity depicted in an image that does not match any candidate entity profile can indicate that the entity is a new entity, and/or an entity that does not have a corresponding entity profile in the entity directory. In this manner, once all the candidate entity profiles have been evaluated, and a match hasn't been found, a new entity profile can be created for the entity depicted in the image(s).

In some implementations, at least a portion of the new entity profile can be populated using information associated with the image(s). For instance, the location information or other information associated with the images can be added to the entity profile. As another example, information associated with the one or more image features determined by the machine learning model can be added to the entity profile.

Referring back to (508), if every candidate entity profile has not been evaluated, method (500) can include returning back to (502). In this manner, each candidate entity profile can be evaluated to determine a potential match.

Figure 7:
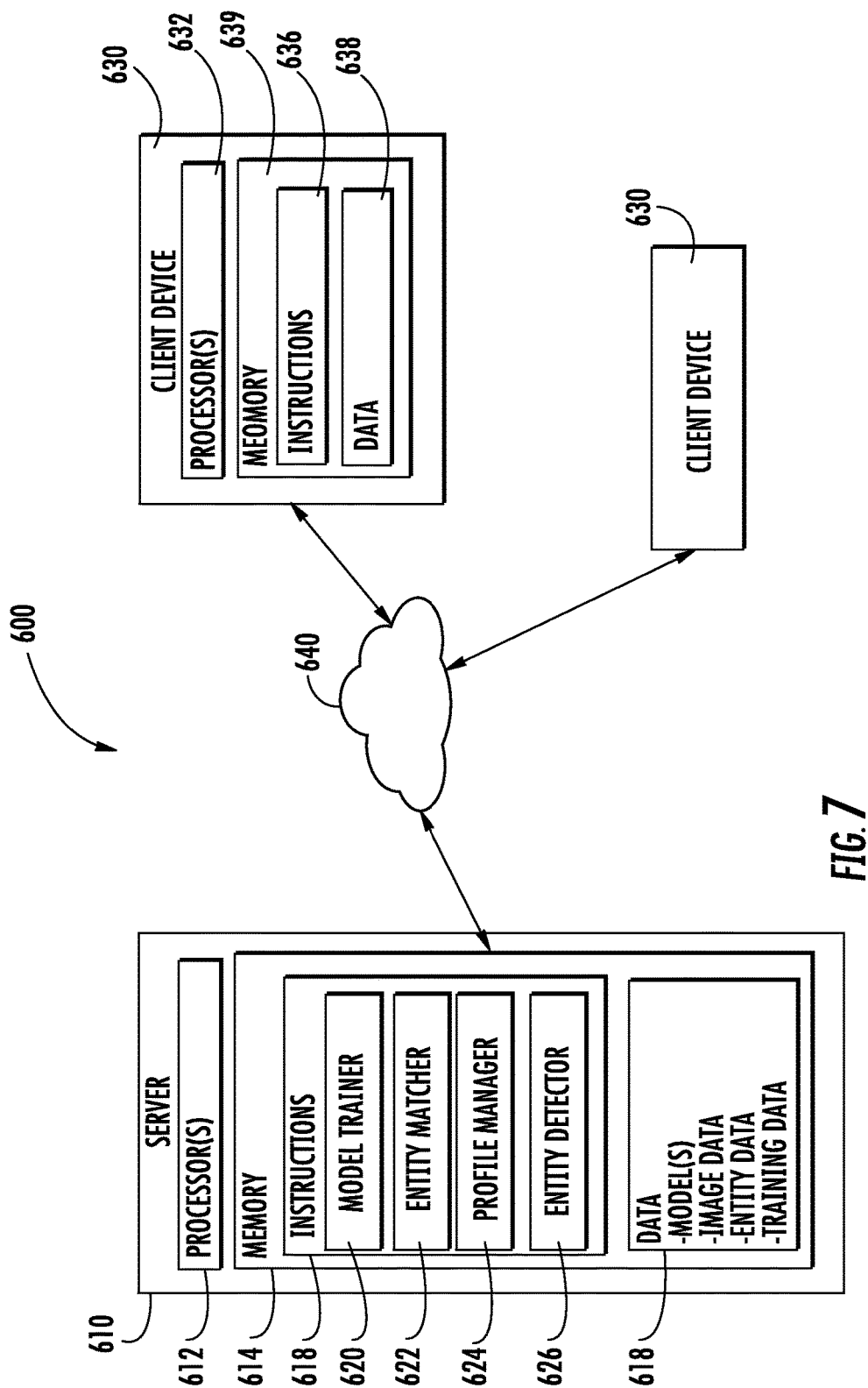
FIG. 7 depicts an example system according to example embodiments of the present disclosure.

FIG. 7 depicts an example computing system 600 that can be used to implement the methods and systems according to example aspects of the present disclosure. The system 600 can be implemented using a client-server architecture that includes a server 610 that communicates with one or more client devices 630 over a network 640. The system 600 can be implemented using other suitable architectures, such as a single computing device.

The system 600 includes a server 610, such as a web server. The server 610 can host a geographic information system, such as a geographic information system associated with a mapping service. The server 610 can be implemented using any suitable computing device(s). The server 610 can have one or more processors 612 and one or more memory devices 614. The server 610 can also include a network interface used to communicate with one or more client devices 630 over the network 640. The network interface can include any suitable components for interfacing with one more networks, including for example, transmitters, receivers, ports, controllers, antennas, or other suitable components.

The one or more processors 612 can include any suitable processing device, such as a microprocessor, microcontroller, integrated circuit, logic device, or other suitable processing device. The one or more memory devices 614 can include one or more computer-readable media, including, but not limited to, non-transitory computer-readable media, RAM, ROM, hard drives, flash drives, or other memory devices. The one or more memory devices 614 can store information accessible by the one or more processors 612, including computer-readable instructions 616 that can be executed by the one or more processors 612. The instructions 616 can be any set of instructions that when executed by the one or more processors 612, cause the one or more processors 612 to perform operations. For instance, the instructions 616 can be executed by the one or more processors 612 to implement a model trainer 620, an entity matcher 622, a profile manager 624, and/or an entity detector 626. Model trainer 620 can be configured to train one or more machine learning network models using a set of training data according to example embodiments of the present disclosure. Entity matcher 622 can be configured to determine match scores between one or more candidate entity profiles and an entity depicted in one or more images according to example embodiments of the present disclosure. Profile manager 624 can be configured to update one or more entity profiles in an entity directory based at least in part on the match scores according to example embodiments of the present disclosure. Entity detector 626 can be configured to detect one or more entities in an image according to example embodiments of the present disclosure.

As shown in FIG. 7, the one or more memory devices 614 can also store data 618 that can be retrieved, manipulated, created, or stored by the one or more processors 612. The data 618 can include, for instance, one or more machine learning models, image data, entity data, training data, and other data. The data 618 can be stored in one or more databases. The one or more databases can be connected to the server 610 by a high bandwidth LAN or WAN, or can also be connected to server 610 through network 640. The one or more databases can be split up so that they are located in multiple locales.

The server 610 can exchange data with one or more client devices 630 over the network 640. Although two client devices 630 are illustrated in FIG. 7, any number of client devices 630 can be connected to the server 610 over the network 640. Each of the client devices 630 can be any suitable type of computing device, such as a general purpose computer, special purpose computer, laptop, desktop, mobile device, navigation system, smartphone, tablet, wearable computing device, a display with one or more processors, or other suitable computing device.

Similar to the server 610, a client device 630 can include one or more processor(s) 632 and a memory 634. The one or more processor(s) 632 can include one or more central processing units (CPUs), graphics processing units (GPUs) dedicated to efficiently rendering images or performing other specialized calculations, and/or other processing devices. The memory 634 can include one or more computer-readable media and can store information accessible by the one or more processors 632, including instructions 636 that can be executed by the one or more processors 632 and data 638. For instance, the memory 634 can store instructions 636 for implementing a user interface module for displaying entity data determined according to example aspects of the present disclosure.

The client device 630 of FIG. 7 can include various input/output devices for providing and receiving information from a user, such as a touch screen, touch pad, data entry keys, speakers, and/or a microphone suitable for voice recognition. For instance, the client device 630 can have a display device 635 for presenting a user interface entity data according to example aspects of the present disclosure. The client device 630 and/or the user interface can be configured to receive a query from a user associated with a request for entity information. Client device 630 can communicate the request to server 610. Server 610 can then access the requested data and provide the data to client device 610. In some implementations, client device 610 and/or display device 635 can provide the information (e.g. provide for display) to the user.

The client device 630 can also include a network interface used to communicate with one or more remote computing devices (e.g. server 610) over the network 640. The network interface can include any suitable components for interfacing with one more networks, including for example, transmitters, receivers, ports, controllers, antennas, or other suitable components.

The network 640 can be any type of communications network, such as a local area network (e.g. intranet), wide area network (e.g. Internet), cellular network, or some combination thereof. The network 640 can also include a direct connection between a client device 630 and the server 610. In general, communication between the server 610 and a client device 630 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
   identifying, by one or more computing devices and from a plurality of images, one or more images that depict an entity;
   determining, by the one or more computing devices, location information associated with the one or more images that depict the entity;
   identifying, by the one or more computing devices and based at least in part on the location information associated with the one or more images that depict the entity, one or more candidate entity profiles from an entity directory;
   providing, by the one or more computing devices, the one or more images that depict the entity and the one or more candidate entity profiles as input to a machine learning model comprising a neural network and at least one recurrent neural network, the neural network comprising a deep convolutional neural network (CNN), the at least one recurrent neural network comprising a long short-term memory network (LSTM), the CNN being configured to receive data indicative of the one or more images that depict the entity, extract features from the one or more images that depict the entity, and provide data indicative of the extracted features to the LSTM, the LSTM being configured to receive data indicative of the one or more candidate entity profiles, obtain text-related information from the one or more candidate entity profiles, and model at least a portion of structured information from a candidate entity profile as a sequence of characters, such that a match score between the extracted features and data from the candidate entity profile can be determined;
   generating, by the one or more computing devices, one or more outputs of the machine learning model, each output comprising a match score associated with at least one candidate entity profile and an image that depicts the entity; and
   updating, by the one or more computing devices, the entity directory based at least in part on the one or more generated outputs of the machine learning model.

2. The computer-implemented method of claim 1, further comprising:
   receiving, by the one or more computing devices, from a user device, data indicative of a user request to access information associated with the entity; and
   providing, by the one or more computing devices, the requested information to the user device based at least in part on the updated entity directory.

3. The computer-implemented method of claim 1, wherein at least one match score is generated without explicitly transcribing text depicted in a corresponding image.

4. The computer-implemented method of claim 1, wherein each match score provides a degree of confidence that an entity depicted in an image corresponds to a candidate entity profile.

5. The computer-implemented method of claim 1, further comprising;
   comparing, by the one or more computing devices, each match score to a match threshold; and
   when a match score associated with a particular candidate entity profile and an image that depicts the entity is greater than the match threshold, associating, by the one or more computing devices, the entity with the particular candidate entity profile.

6. The computer-implemented method of claim 5, further comprising, when the match score associated with the particular candidate entity profile and the image that depicts the entity is greater than the match threshold, associating at least one of the one or more images that depict the entity with the particular candidate entity profile.

7. The computer-implemented method of claim 1,
   wherein identifying the one or more candidate entity profiles comprises:
   accessing, by the one or more computing devices, the entity directory, the entity directory comprising a plurality of entity profiles; and
   filtering, by the one or more computing devices, the entity directory based at least in part on the location information associated with the one or more images that depict the entity to identify the one or more candidate entity profiles.

8. The computer-implemented method of claim 1, further comprising:
   obtaining, by the one or more computing devices, a plurality of training images having verified associated entity information; and
   training, by the one or more computing devices, the machine learning model based at least in part on the plurality of training images and the verified associated entity information.

9. The computer-implemented method of claim 8, Wherein training, by the one or more computing devices, the machine learning model comprises adjusting the machine learning model based at least in part on the plurality of training images and the verified associated entity information.

10. The computer-implemented method of claim 1, wherein updating the entity directory comprises modifying, based at least in part on the one or more generated outputs of the machine learning model, at least one entity profile.

11. The computer-implemented method of claim 1, wherein updating the entity directory comprises creating, based at least in part on the one or more generated outputs of the machine learning model, a new entity profile.

12. The computer-implemented method of claim 1, wherein the entity is a business, and wherein the at least one candidate entity profile comprises data associated with the business.

13. The computer-implemented method of claim 12, wherein the data associated with the business comprises at least one of a name associated with the business, an address associated with the business, a logo associated with the business, a phone number associated with the business, a uniform resource locator (URL) associated with the business, or one or more categories associated with the business.

14. A computing system, comprising:
one or more processors; and
one or more memory devices storing computer-readable instructions that when executed by the one or more processors cause the computing system to perform operations comprising:
identifying, from a plurality of images, one or more images that depict an entity;
determining location information associated with the one or more images that depict the entity;
identifying, based at least in part on the location information associated with the one or more images that depict the entity, one or more candidate entity profiles from an entity directory;
providing the one or more images that depict the entity and the one or more candidate entity profiles as input to a machine learning model comprising a neural network and at least one recurrent neural network, the neural network comprising a deep convolutional neural network (CNN), the at least one recurrent neural network comprising a long short-term memory network (LSTM), the CNN being configured to receive data indicative of the one or more images that depict the entity, extract features from the one or more images that depict the entity, and provide data indicative of the extracted features to the LSTM, the LSTM being configured to receive data indicative of the one or more candidate entity profiles, obtain text-related information from the one or more candidate entity profiles, and model at least a portion of structured information from a candidate entity profile as a sequence of characters, such that a match score between the extracted features and data from the candidate entity profile can be determined;
generating one or more outputs of the machine learning model, each output comprising a match score associated with at least one candidate entity profile and an image that depicts the entity; and
updating the entity directory based at least in part on the one or more generated outputs of the machine learning model.

15. The computing system of claim 14, wherein at least one match score is generated without explicitly transcribing text depicted in a corresponding image.

16. One or more tangible, non-transitory computer-readable media storing computer-readable instructions that when executed by one or more processors cause the one or more processors to perform operations comprising:
identifying, from a plurality of images, one or more images that depict an entity;
determining location information associated with the one or more images that depict the entity;
identifying, based at least in part on the location information associated with the one or more images that depict the entity, one or more candidate entity profiles from an entity directory;
providing the one or more images that depict the entity and the one or more candidate entity profiles as input to a machine learning model comprising a neural network and at least one recurrent neural network, the neural network comprising a deep convolutional neural network (CNN), the at least one recurrent neural network comprising a long short-term memory network (LSTM), the CNN being configured to receive data indicative of the one or more images that depict the entity, extract features from the one or more images that depict the entity, and provide data indicative of the extracted features to the LSTM, the LSTM being configured to receive data indicative of the one or more candidate entity profiles, obtain text-related information from the one or more candidate entity profiles, and model at least a portion of structured information from a candidate entity profile as a sequence of characters, such that a match score between the extracted features and data from the candidate entity profile can be determined;
generating one or more outputs of the machine learning model, each output comprising a match score associated with at least one candidate entity profile and an image that depicts the entity; and
updating the entity directory based at least in part on the one or more generated outputs of the machine learning model.

17. The computing system of claim 14, wherein the entity is a business, and wherein the at least one candidate entity profile comprises data associated with the business.

18. The one or more tangible, non-transitory computer-readable media of claim 16, wherein at least one match score is generated without explicitly transcribing text depicted in a corresponding image.

19. The one or more tangible, non-transitory computer-readable media of claim 16, wherein the entity is a business, and wherein the at least one candidate entity profile comprises data associated with the business.

* * * * *